United States Patent
Takeda et al.

(10) Patent No.: US 7,992,629 B2
(45) Date of Patent: Aug. 9, 2011

(54) AIR CONDITIONER FOR A VEHICLE HAVING LEARING FUNCTION AND CONTROL METHOD

(75) Inventors: Hiroshi Takeda, Nagoya (JP); Yasufumi Kojima, Gifu (JP); Hiroyuki Tomita, Nagoya (JP)

(73) Assignee: Denso Corporation, Kariya (JP)

( * ) Notice: Subject to any disclaimer, the term of this patent is extended or adjusted under 35 U.S.C. 154(b) by 988 days.

(21) Appl. No.: 11/903,751

(22) Filed: Sep. 24, 2007

(65) Prior Publication Data

US 2008/0073056 A1    Mar. 27, 2008

(30) Foreign Application Priority Data

Sep. 25, 2006 (JP) ................. 2006-259434

(51) Int. Cl.
*B60H 1/00* (2006.01)
(52) U.S. Cl. .......... 165/202; 165/204; 165/42; 165/244; 165/247; 237/12.3 A; 237/12.3 B; 237/2 A
(58) Field of Classification Search .................. 165/202, 165/204, 42, 43, 244, 247; 237/12.3 A, 12.3 B, 237/2 A
See application file for complete search history.

(56) References Cited

U.S. PATENT DOCUMENTS

| | | | | |
|---|---|---|---|---|
| 4,311,188 A | * | 1/1982 | Kojima et al. ................. | 165/202 |
| 4,538,760 A | * | 9/1985 | Kobayashi ..................... | 237/2 A |
| 4,738,396 A | * | 4/1988 | Doi et al. ....................... | 237/2 A |
| 5,603,226 A | * | 2/1997 | Ishikawa et al. ................. | 62/182 |
| 6,220,517 B1 | * | 4/2001 | Ichishi et al. .................. | 236/49.3 |
| 6,488,213 B2 | * | 12/2002 | Ohga et al. ..................... | 236/49.3 |
| 6,498,958 B1 | | 12/2002 | Tateishi et al. | |
| 6,644,558 B2 | * | 11/2003 | Ohga et al. ..................... | 236/49.3 |
| 6,718,783 B2 | * | 4/2004 | Ohga et al. ....................... | 62/244 |
| 6,827,284 B2 | * | 12/2004 | Ichishi et al. .................. | 236/49.3 |
| 6,945,060 B2 | * | 9/2005 | Tomita et al. .................... | 62/157 |

FOREIGN PATENT DOCUMENTS

| | | |
|---|---|---|
| JP | 02-057419 | 2/1990 |
| JP | 2003-094927 | 4/2003 |
| JP | 2003-220816 | 8/2003 |
| JP | 2004-196111 | 7/2004 |

OTHER PUBLICATIONS

English translation of JP 02-057419.*
Office Action mailed on Dec. 7, 2010 in the corresponding Japanese Application No. 2006-259434.

* cited by examiner

*Primary Examiner* — Cheryl J Tyler
*Assistant Examiner* — Melanie Reuter
(74) *Attorney, Agent, or Firm* — Harness, Dickey & Pierce, PLC (57) ABSTRACT

In an air amount control for controlling an air amount to be blown into a vehicle compartment, a water temperature control map in which the air amount is set based on a water temperature of cooling water for the vehicle is stored, and the air amount is determined based on control characteristics of the water temperature control map. The water temperature control map is learned and changed based on a set air amount, and the air amount to be blown into the vehicle compartment is determined based on the learned water temperature control map in a case where the set air amount is changed by a passenger and the water temperature is in a predetermined range.

9 Claims, 4 Drawing Sheets

AIR CONDITIONER FOR A VEHICLE HAVING LEARING FUNCTION AND CONTROL METHOD

CROSS REFERENCE TO RELATED APPLICATION

This application is based on Japanese Patent Application No. 2006-259434 filed on Sep. 25, 2006, the contents of which are incorporated herein by reference in its entirety.

FIELD OF THE INVENTION

The present invention relates to an air conditioner for a vehicle, which can learn and change a water temperature control map where an air amount to be blown into a vehicle compartment is set based on a cooling water temperature of the vehicle, when a passenger sets and change the air amount.

BACKGROUND OF THE INVENTION

In a vehicle air conditioner described in JP-A-2-57419, a blowing amount of conditioned air is set based on a temperature of cooling water for a vehicle engine. The vehicle air conditioner is provided with a control map in which an air amount is determined based on the temperature of the cooling water.

When the conditioned air is adjusted to a predetermined temperature, the air is heated in a heater unit by using the cooling water of the vehicle engine. When the temperature of the cooling water is low such as in a case where the vehicle engine starts its operation, air cannot be sufficiently heated by the heater unit. In this case, the air blowing amount is controlled in accordance with the above control map, so as to prevent the passenger from feeling uncomfortable.

Generally, a passenger's favorite air-blowing amount is different for each passenger. Even when the air blowing amount is set based on the control map, it is necessary to reset the air blowing amount if uncomfortable feeling is given to the passenger relative to the air blowing amount. However, the above vehicle air conditioner does not have a learning function in the control map. Accordingly, every at the control time where the control map is used, it is necessary for the passenger to reset an air blowing amount, thereby increasing passenger's operation for setting the air blowing amount.

SUMMARY OF THE INVENTION

The present invention has been made in view of the foregoing problems, and it is an object of the present invention to provide an air conditioner for a vehicle, in which a water temperature control map is suitably learned and changed based on a passenger's set air amount so as to improve air-conditioning feeling while reducing passenger's operation.

It is another object of the present invention to suitably learn and change a water temperature control map based on a set air amount in a predetermined temperature range of water temperature, thereby improving air-conditioning feeling given to the passenger.

According to an aspect of the present invention, an air conditioner for a vehicle includes an air-blowing unit for blowing air into a vehicle compartment, storing means for storing a water temperature control map in which an air amount to be blown into the vehicle compartment is set based on a water temperature of cooling water for the vehicle, air amount setting means for setting and changing a set air amount by a passenger, determining means for determining the air amount to be blown into the vehicle compartment based on the water temperature control map, and learning means for learning and changing the water temperature control map based on the set air amount when the determining means determines the air amount to be blown into the vehicle compartment based on the water temperature control map in a case where the set air amount is changed by the air amount setting means. Accordingly, the learning and changing of the water temperature control map can effectively reflect the air amount set by the passenger, thereby reducing passenger's operation for setting a passenger-favored air blowing amount.

For example, the learning means may learn and change control characteristics of the water temperature control map within a predetermined control range when the water temperature is in a predetermined temperature range, or the learning means may learn and change the control characteristics of the water temperature control map such that a change rate of the air amount relative to a change rate of the water temperature is limited in a predetermined range when the water temperature is in a predetermined temperature range.

A water temperature detecting unit which detects the water temperature may be provided. In this case, the learning means may learn and change the water temperature control map only when the air amount is changed by the air amount setting means and the water temperature detected by the water temperature detecting unit is in a predetermined temperature range.

The storing means may store plural set air amounts set and changed at the past times. In this case, the learning means learns and changes control characteristics of the water temperature control map based on the set air amount stored in the storing means and the set air amount set and changed at the present time.

The water temperature control map may have control characteristics in which the water temperature and the air amount have a proportionality relation. In this case, the learning means learns and changes the water temperature control map such that a change rate of the air amount relative to a change rate of the water temperature is changed in the control characteristics based on the proportionality relation by using a point where the air amount is a predetermined air amount and the water temperature is a predetermined water temperature as a center of the proportionality relation.

For example, the predetermined control range may be a range enclosed by a first point where the air amount is a first air amount and the water temperature is a first temperature, a second point where the air amount is the first air amount and the water temperature is a second temperature higher than the first temperature, a third point where the air amount is a second air amount larger than the first air amount and the water temperature is a third temperature that is higher than the first temperature and lower than the second temperature, and a fourth point where the air amount is the second air amount and the water temperature is a fourth temperature higher than the second temperature.

According to another aspect of the present invention, in an air conditioner for a vehicle, learning means learns and changes a water temperature control map within a predetermined control range based on a set air amount when the set air amount is changed by air amount setting means, and determining means determines the air amount to be blown into the vehicle compartment based on the learned water temperature control map in a predetermined temperature range of the water temperature. Accordingly, the water temperature control map can be suitably learned and changed based on the set air amount in the predetermined temperature range of the water temperature, thereby improving air-conditioning feeling given to the passenger.

BRIEF DESCRIPTION OF THE DRAWINGS

Additional objects and advantages of the present invention will be more readily apparent from the following detailed description of preferred embodiments when taken together with the accompanying drawings. In which.

DETAILED DESCRIPTION OF THE PREFERRED EMBODIMENTS

An embodiment of the present invention will be now described with reference to FIGS. 1 to 7. First, a system structure of a vehicle air conditioner according to the embodiment will be described with reference to FIG. 1.

Figure 1:
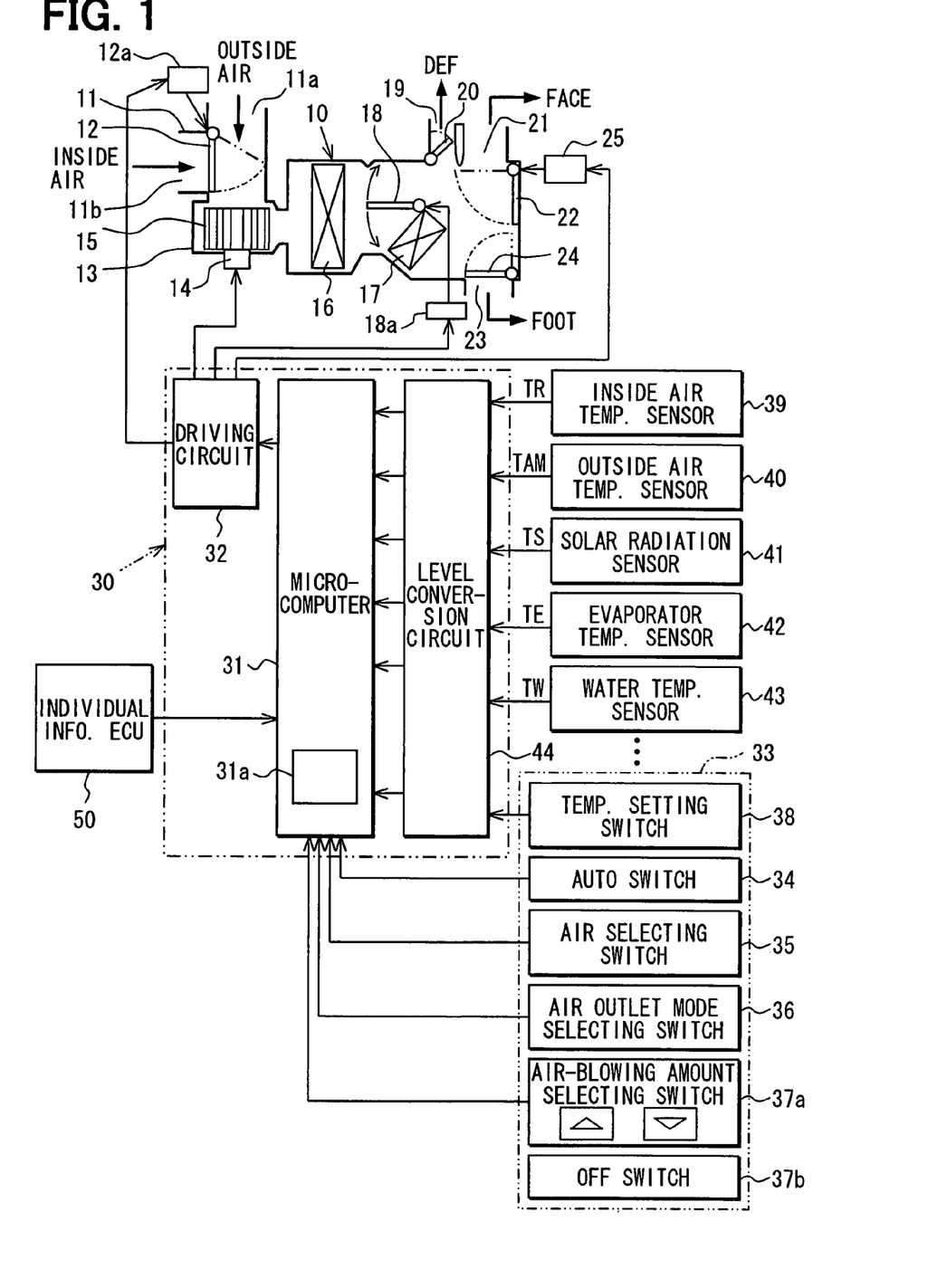
FIG. 1 is a schematic diagram showing a vehicle air conditioner, according to an embodiment of the present invention.

An air conditioning unit 10 constitutes an indoor unit of a vehicle air conditioner, located inside of a vehicle compartment (e.g., a passenger compartment). An inside/outside air switching box 11 including an outside-air introduction port 11a and an inside-air introduction port 11b is disposed on the most upstream side of an air flow in the air conditioning unit 10. An inside/outside air switching door 12 is rotatably located in the inside/outside air switching box 11.

The inside/outside air switching door 12 is disposed at a portion between the outside-air introduction port 11a and the inside-air introduction port 11b. The inside/outside air switching door 12 is driven by an actuator 12a to switch the air to be introduced into the air conditioning unit 10 between inside air and outside air, or to adjust a mixing ratio of the inside air to the outside air.

A blower 13 sucks air into the inside/outside air switching box 11, and blows the sucked air toward the downstream side of the air conditioning unit 10. The blower 13 includes a blower motor 14 and a centrifugal blower fan 15 connected to a rotary shaft. An evaporator 16 and a heater core 17 are located on a downstream side of the blower fan 15.

The evaporator 16 is a heat exchanger for cooling, and is connected with a compressor or the like to be driven by a vehicle engine (not shown) to constitute a refrigeration cycle. The evaporator 16 allows low-pressure refrigerant therein to absorb heat from the air and then to evaporate, thereby cooling the air. Here, the low-pressure refrigerant is generally known refrigerant decompressed by a decompressor in the refrigerant cycle. The heater core 17 is a heat exchanger for heating, in which cooling water (coolant) for cooling a vehicle engine (not shown) is circulated as a heat source for heating the air passing through the heater core 17.

An air mix door 18 is rotatably provided as an air temperature adjustment means for adjusting the temperature of conditioned air to be blown into the passenger compartment. The air mix door 18 is located on the upstream side of the heater core 17 in the air flow direction. The air mix door 18 is driven by the actuator 18a to adjust an opening degree of the air mix door 18. This adjusts the ratio of the air passing through the heater core 17 to the air bypassing the heater core 17, so that the temperature of air blown off into the vehicle compartment is adjusted.

On the most downstream side of the air conditioning unit 10 are provided air-outlet mode switching doors such as a defroster door 20 for opening and closing a defroster (DEF) air outlet 19, a face door 22 for opening and closing a face (FACE) air outlet 21, and a foot door 24 for opening and closing a foot (FOOT) air outlet 23.

Each of the doors 20, 22, and 24 constitutes air-outlet mode switching means, which is driven by the actuator 25 to open and close each of the air outlets 19, 21, and 23 thereby to set various air-outlet modes (a face mode, a bi-level mode, a foot mode, a foot/defroster mode, a defroster mode, and the like). The air (conditioned air) whose temperature is adjusted is blown off into the vehicle compartment from at least one air outlet opened according to a set air-outlet mode.

In the face mode, the face air outlet 21 is fully opened, and the defroster air outlet 19 and the foot air outlet 23 are closed, so that the conditioned air is blown off only from the face air outlet 21 to an upper body of the passenger in the vehicle compartment.

In the bi-level mode, the face air outlet 21 and the foot air outlet 23 are fully opened, and the defroster air outlet 19 is closed, so that the conditioned air is blown off from both the face air outlet 21 and the foot air outlet 23 toward the passenger's upper body and feet sides (i.e., upper side and lower side in the vehicle compartment) by the substantially same amount.

In the foot mode, the face air outlet 21 is closed, the foot air outlet 23 is fully opened, and the defroster air outlet 19 is opened by a small opening degree. Thus, while the conditioned air is mainly blown off from the foot air outlet 23 to the passenger's foot side, a small amount of conditioned air is blown from the defroster air outlet 19 toward the inner surface of a windshield in the vehicle compartment.

In the defroster mode, the face air outlet 21 and the foot air outlet 23 are closed, and the defroster air outlet 19 is fully opened, so that the conditioned air is blown off only from the defroster air outlet 19 toward the inner surface of the windshield.

In the foot/defroster mode, the face air outlet 21 is closed, and the defroster air outlet 19 and the foot air outlet 23 are fully opened, so that the conditioned air is blown off from the foot air outlet 23 and the defroster air outlet 19 by the substantially same amount.

An air conditioning controller 30 has a microcomputer 31 serving as control means. The amount of blown air is controlled by adjusting an applied voltage (blower voltage) to the blower motor 14 via a driving circuit 32 based on an output signal from the microcomputer 31 thereby to adjust the number of revolutions of the blower motor 14. It is noted that the other actuators 12a, 18a, and 25 are also controlled by the driving circuit 32 based on output signals from the microcomputer 31.

The microcomputer 31 includes a central processing unit (CPU) (not shown), a ROM, a RAM, an I/O port, an A/D converter, a stand-by RAM 31a, and the like, which are well known.

The stand-by RAM 31a constitutes a storage portion (storing means) of this embodiment, and is a RAM for storing (backing up) values learned from the passenger's preference, even when an ignition switch (hereinafter referred to as an IG) for intermittently actuating the vehicle engine is turned off. Also, when the IG is turned off, an electric power is directly supplied from a battery mounted on the vehicle without via the IG. Furthermore, a power source for backup (not shown) is provided for supplying the power to the microcomputer 31 for a short time even in a state where the electric connection between the microcomputer 31 and the battery is interrupted.

An operation signal is input into the microcomputer 31 from an air conditioning operational unit 33 installed on a dashboard within the vehicle compartment. The air conditioning operational unit 33 includes an auto switch 34 for setting an automatic control condition of the air conditioner, and an inside/outside air selecting switch 35 for manually switching and setting an inside/outside air suction mode. The operational unit 33 also includes an air outlet mode selecting switch 36 for manually switching and setting an air outlet mode, an air-blowing amount selecting switch 37a for manually switching and setting an amount of blown air from the fan 15, an off switch 37b for turning off the air blowing from the fan 15, and a temperature setting switch 38 for setting a passenger's favorite in-vehicle temperature (set air temperature).

In this embodiment, the temperature setting switch 38 serves as an operation portion for the passenger to set a desired temperature of the air-conditioning state in the vehicle compartment. The temperature setting switch 38 permits the passenger to change or adjust the set temperature in the vehicle compartment to a value desired by the passenger. In this example, the desired set temperature can be set by a temperature of 0.5° C., for example.

The air-blowing amount selecting switch 37 includes an air-blowing amount up switch and an air-blowing amount down switch. The air-blowing amount up switch outputs a signal for increasing a blower voltage (applied voltage to the motor for driving 14) by one level (0.25 volts) per push. The air-blowing amount down switch outputs a signal for decreasing a blower voltage by one level (0.25 volts) per push. As the air-blowing amount selecting switch 37, a rotary type switch or a seesaw type switch may be used.

The OFF switch 37b is a switch for setting the air blowing amount to zero. When a passenger operates the OFF switch 37b, a signal for setting the blower voltage to zero is output to the microcomputer 31.

The microcomputer 31 receives input signals from various sensors, each serving as environment condition detecting means for detecting the environment conditions which may affect the air-conditioning state in the vehicle compartment.

Specifically, the microcomputer 31 includes an inside air temperature sensor 39, an outside air temperature sensor 40, a solar radiation sensor 41, an evaporator temperature sensor 42, a water temperature sensor 43, etc. The inside air temperature sensor 39 serves as an inside air temperature detecting unit for detecting the temperature of air in the vehicle compartment (inside air temperature) TR. The outside air temperature sensor 40 serves as an outside air temperature detecting unit for detecting the temperature of air outside the vehicle compartment (outside air temperature) TAM. The solar radiation sensor 41 serves as solar a radiation amount detecting unit for detecting an amount of solar radiation receiving in the vehicle compartment TS. The evaporator temperature sensor 42 serves as an evaporator temperature detecting unit for detecting an evaporator temperature (e.g., an evaporator blown-air temperature, post-evaporator air temperature) TE. The water temperature sensor 43 serves as a water temperature detecting unit for detecting a temperature TW of engine-cooling water (cooling water) circulating in the heater core 17. The signal from each of these sensors 39 to 43, etc. is input into the microcomputer 31 via the corresponding level conversion circuit 44, is A/D converted and is read by and into the microcomputer 31. Also, a signal from the temperature setting switch 38 is level-converted by the level conversion circuit 44 to be input into the microcomputer 31.

An individual ID is input from an individual information controller (hereinafter referred to as an individual information ECU) 50 mounted on the vehicle to the microcomputer 31. The individual information ECU 50 identifies a passenger(s) riding in the vehicle compartment among pre-registered persons who are going to get on the vehicle, based on information, including a door unlock key and the like. Then, the ECU 50 outputs individual identification information (individual ID) of the passenger identified via an in-vehicle communication network.

The identification of the passenger by the individual information ECU 50 is based on the information about the door unlock key, but is not limited thereto. The identification of the passenger may be based on, for example, one or a combination of information on an adjusted seat position, on an adjusted steering wheel position, on an adjusted room mirror position, on an image taken by an indoor camera, and a signal or the like input from a passenger identification switch operated by the passenger.

Figure 2:
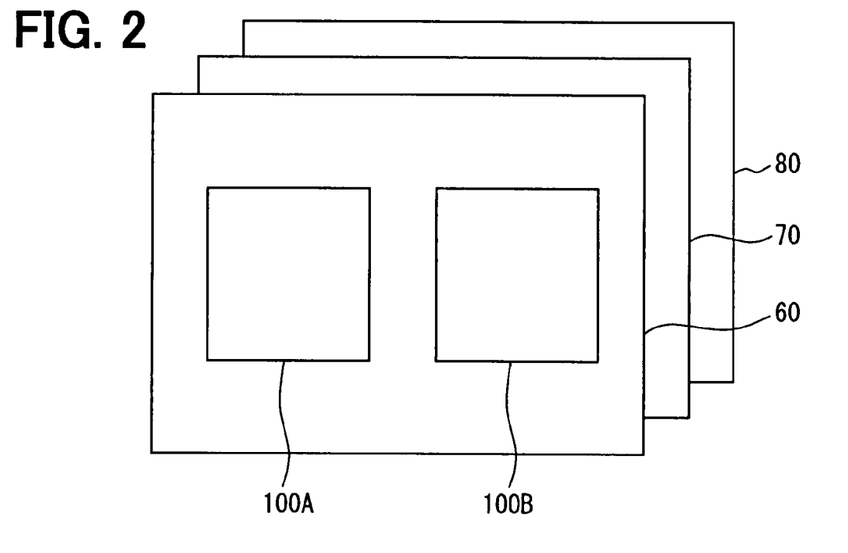
FIG. 2 is two-dimensional maps for pre-registered persons who are going to get on the vehicle.
Figure 5:
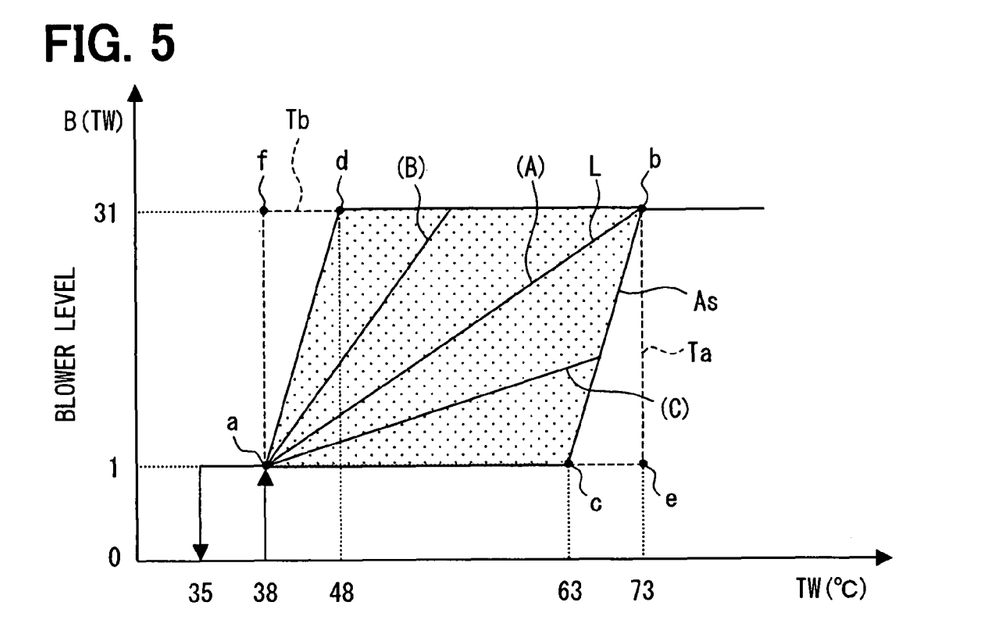
FIG. 5 is a diagram showing control characteristics of a water temperature control map and a changing method of the control characteristics in the water temperature control map.
Figure 6:
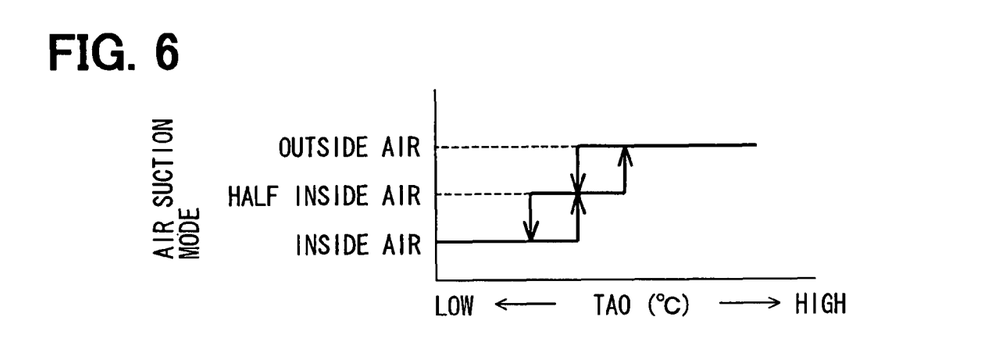
FIG. 6 is a graph for determining an inside/outside air suction mode based on a target air temperature TAO.
Figure 7:
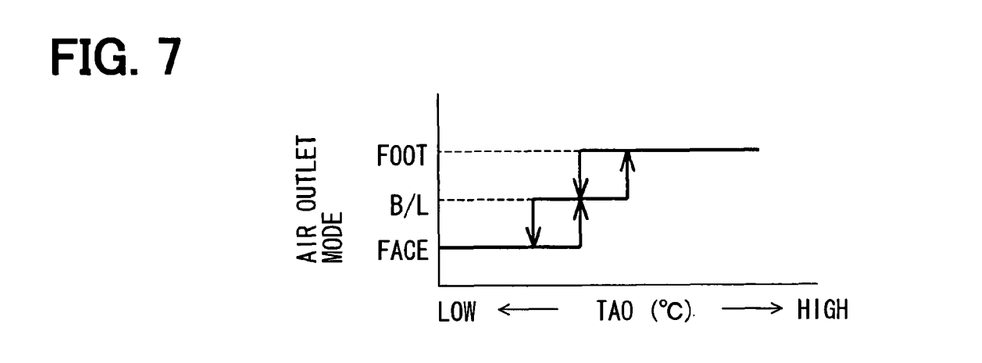
FIG. 7 is a graph for determining an air outlet mode based on the target air temperature TAO.

FIG. 2 shows maps 60, 70, and 80 respectively corresponding to pre-registered passengers who are going to ride in the vehicle, pre-registered to the ECU 50. The maps 60, 70, and 80 are stored in the stand-by RAM 31a. Each of the maps 60, 70, 80 includes a water temperature control map 100A, and an environment control map 100B. The water temperature control map 100A is used for determining an air blowing amount A (blower level) based on the temperature TW of the engine-cooling water, as shown in FIG. 5. The environment control map 100B is used for determining an air blowing amount B based on environment conditions such as an outside air temperature TAM, an amount of solar radiation TS and an inside air temperature TR. The environment control map 100B is similar to that in U.S. Pat. No. 6,498,958 (corresponding to JP-A-2000-293204), which is herein incorporated by reference.

Furthermore, a control set temperature TSET corresponding to respective environment condition is stored to the stand-by RAM 31a. The stand-by RAM 31a is also provided with an area for storing a set sir amount set by a passenger using the air-blowing amount selecting switch 37a.

Reference will now be made to an operation of the vehicle air conditioner with the above-mentioned structure according to this embodiment.

Figure 3:
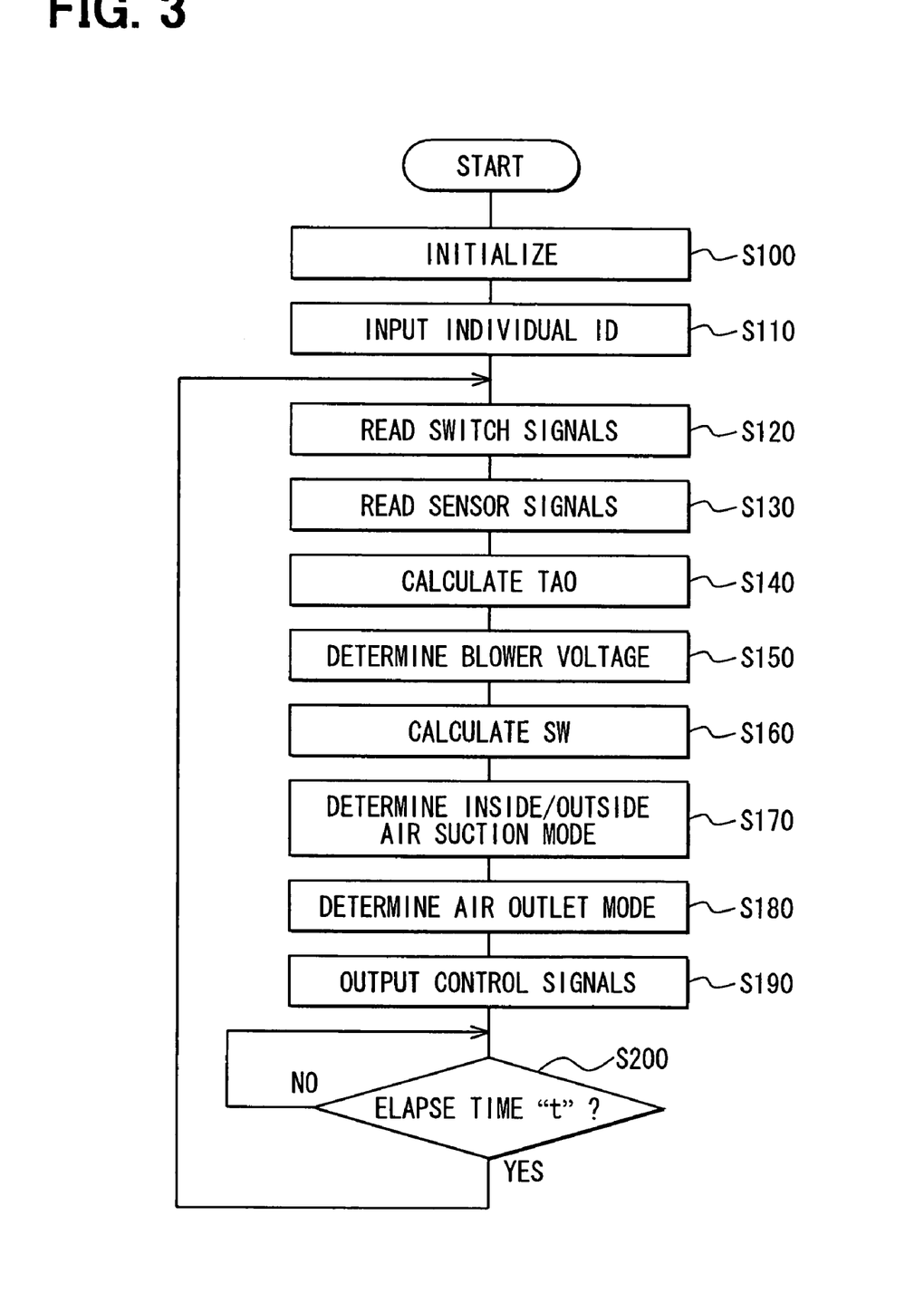
FIG. 3 is a flowchart schematically showing a control operation performed by a microcomputer in the vehicle air conditioner.

FIG. 3 is a flowchart schematically showing a control operation performed by the microcomputer 31. The control operation shown in FIG. 3 is started upon turning on the IG.

First, in step S100, various conversions, a flag, and the like are initialized. In next step S100, individual identification information is input from the individual information ECU 50 to identify a passenger(s) riding in the vehicle compartment. This step S110 corresponds to passenger identification means of this embodiment for identifying the passenger(s) actually riding (entering) in the vehicle compartment among the pre-registered persons who are going to get on the vehicle.

In step S120, operation signals from various switches 34 to 38 of the air conditioning operational unit 33 are read in. Then, in step S130, sensor detection signals (environment condition signals) from various sensors 39 to 43 are read in.

In next step S140, a target temperature TAO of air (target air temperature) to be blown off into the vehicle compartment is calculated based on the environment condition signals read in step S130 and the control set temperature TSET stored in the stand-by RAM 31a. It is noted that the TAO is an air temperature to be blown into the vehicle compartment, which is required to keep the temperature in the vehicle compartment to the control set temperature TSET, regardless of a change in environment condition (thermal load condition).

That is, in step S140, the target air temperature TAO is calculated based on the following formula (1):

$$TAO=KSET \times TSETc-KR \times TR-KAM \times TAM-KS \times TS+C \quad (1)$$

where KSET, KR, KAM, KS are coefficients, C is a constant, TSET, TR, TAM, and TS are a control set temperature, an inside air temperature, an outside air temperature, and an amount of solar radiation, respectively, as mentioned above.

Then, the procedure proceeds to step S150 shown in FIG. 3. A blower voltage for determining the amount of blown air is determined. In this embodiment, a map 60, 70, 80 of a passenger who is going to ride in the vehicle is selected and read from the ECU 50. In the read map 60, 70, 80, the air amounts to be blown into the vehicle compartment are respectively calculated at the control maps 100A, 100B, and a smaller one is selected as a selected air-blowing amount. The control map 100A is a water temperature control map 100A in which the air-blowing amount B (TW) is determined based on the cooling water temperature TW in accordance with the graph shown in FIG. 5. In contrast, the control map 100B is an environment condition control map 100B in which the air-blowing amount B(EN) is determined based on the environment conditions. Among the air-blowing amount B(TW) determined by the water temperature control map 100A and the air-blowing amount B(EN) determined by the environment condition control map 100B, a smaller one is selected as the selected air-blowing amount, and a blower voltage to be applied is determined based on the selected air-blowing amount.

For example, the control characteristics in each map 60, 70, 80 can be set such that the water temperature control map 100A is selected to be used when the cooling water temperature TW is lower than a predetermined temperature, and the environment condition control map 100B is selected to be used when the cooling water temperature TW is higher than the predetermined temperature. Specifically, when the cooling water temperature TW is lower than a predetermined temperature, the microcomputer 31 selects the water temperature control map 100A and the air-blowing amount is determined based on the water temperature control map 100A. In contrast, when the cooling water temperature TW is equal to or higher than the predetermined temperature, the microcomputer 31 selects the environment condition control map 100B and the air-blowing amount is determined based on the environment condition control map 100B.

Next, the procedure proceeds to step S160. An opening degree SW of the air mix door 18 corresponding to the calculated TAO is calculated based on the following formula (3).

$$SW=(TAO-TE)/(TW-TE) \times 10(\%) \quad (3)$$

Then, the procedure proceeds to step S170. The inside/outside air suction mode of the inside/outside air switching door 12 is determined based on the calculated TAO by using the control characteristics (map) shown in FIG. 6. Then, the air outlet mode with the air-outlet mode switching doors 20, 22, and 24 is determined based on the calculated TAO by using the control characteristics (map) shown in FIG. 7.

Then, the procedure proceeds to step S190. Various kinds of control signals determined in the above-mentioned steps S150 to S180 are fed to the blower motor 14, and actuators 12a, 18a, 25 via the driving circuit 32 thereby to control the number of revolutions of the blower motor 14 and operations of the actuators 12a, 18a, 25.

In next step S200, it is determined whether or not a control process cycle of "t" seconds has elapsed. When the "t" seconds has elapsed, the procedure returns to step S110, and then the above-mentioned processes will be repeatedly performed.

Next, an air-amount learning operation will be described with reference to the flowchart of FIG. 4. The air-amount learning operation is started and performed in accordance with a change operation of a set volume of the air-blowing amount selecting switch 37a by a passenger.

Figure 4:
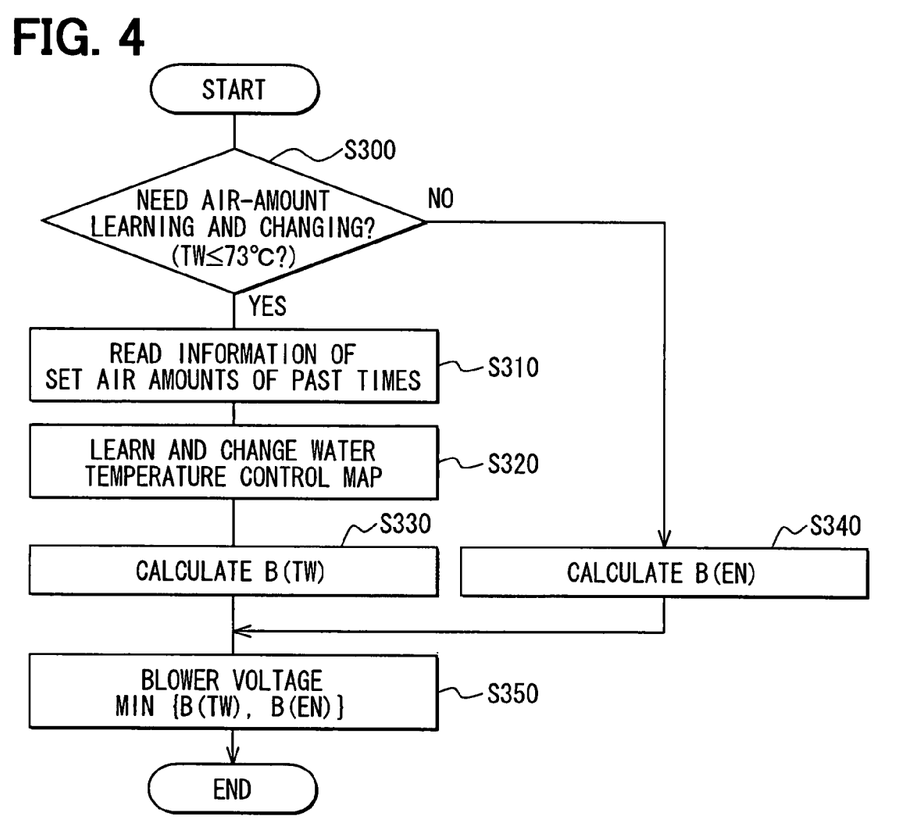
FIG. 4 is a flowchart showing a learning operation of an air blowing amount (blower voltage)

As shown in FIG. 4, in step S300, when a passenger operates the air-blowing amount selecting switch 37a, it is determined whether the water temperature control map 100A is necessary to be learned and changed. For example, when the cooling water temperature TW at the time of the switching operation of the passenger using the air-blowing amount selecting switch 37a is equal to or lower than a predetermined temperature (e.g., 73° C.), it is determined that learning and changing of the air blowing amount are necessary to be performed in step S300. When the determination in step S300 is YES, the procedure proceeds to step S310.

In step S310, information of the set air amounts (i.e., set air-blowing amounts) at the past plural times (e.g., 4 times), stored in the stand-by RAM 31a, is read. For example, the information of the set air amounts at the past 4 times from the present time is read.

Then, at step S320, the water temperature control map 100A is learned and changed based on the set air amounts of the past four times read from the stand-by RAM 31a and the set air amount at the present time. FIG. 5 shows pre-stored control characteristics of the water temperature control map 100A. The air-blowing amount B(TW) to be blown substantially corresponds to the blower level (blower voltage). Therefore, in the example of FIG. 5, the blower level is used instead of the air-blowing amount B(TW).

In the control characteristics shown in FIG. 5, in a temperature range of the cooling water temperature TW from a first temperature (e.g., 38° C.) to a second temperature (e.g., 73° C.), the cooling water temperature TW and the blower level (air-blowing amount B(TW)) have a proportionality relation. Here, the first temperature e.g., 38° C. is a temperature corresponding to the human body temperature, and the second temperature e.g., 73° C. corresponds to a stable cooling water temperature. Specifically, in FIG. 5, the point "a" is a basis point "a" in which the cooling water temperature TW of 38° C. and the blower level of 1 are crossed, the point "b" is a point in which the cooling water temperature TW of 73° C. and the blower level of 31 are crossed, and the connection line connecting the point "a" and the point "b" is a straight line V1. In FIG. 5, a basis control line L is positioned on the straight line V1, as an example.

As shown in FIG. 5, in the temperature range of the cooling water temperature TW from the first temperature (e.g., 38° C.) to the second temperature (e.g., 73° C.), the blower level (air-blowing amount B(TW)) corresponding to the respective cooling water temperature TW is determined based on the basis control line L (e.g., V1). When the cooling water temperature TW is equal to or higher than 73° C., the blower level is set at 31. In a temperature range of the cooling water temperature TW from 35° C. to 38° C., the blower level is set at 0 when the cooling water temperature TW is decreased to 35° C. or below, and the blower level is set at 1 when the cooling water temperature TW is increased to 38° C. The blower level is changed with hysteresis in the temperature range of the cooling water temperature TW from 35° C. to 38° C.

Furthermore, in FIG. 5, the point "c" is a cross point in which the cooling water temperature TW of 63° C. and the blower level of 1 are crossed, the point "d" is a cross point in which the cooling water temperature TW of 48° C. and the blower level of 31 are crossed. Therefore, the control characteristics of the water temperature control map 100A are changed in a control area As of a lozenge shape, enclosed by the four points "a", "b", "c" and "d". Here, the temperatures 35° C., 38° C., 48° C., 63° C. and 73° C. of the cooling water temperature TW and the blower levels 1 and 31 are examples for setting the control area As, but can be suitably changed.

The learning and changing of the water temperature control map 100A is changed based on the air blowing amount (i.e., air amount) set and changed by the air-blowing amount selecting switch 37a such that the gradient of the basis control line L around the point "a" is changed within the control area As. The gradient of the basis control line L can be changed such that a gradient, obtained in accordance with the least square approximation by using the set air amounts of the past four times read from the stand-by RAM 31a and the set air amount at the present time, is set to a basis control line L after learning.

When the gradient of the basis control line L becomes larger than the gradient of the straight line V1, the blower level of 31 is reached at a cooling water temperature TW lower than 73° C. In this case, in a water temperature area higher than the cooling water temperature TW at which the blower level is reached to the blower level of 31, the blower level is set at the fixed level of 31. For example, when the gradient of the basis control line L is changed to the gradient of straight line V2 from that of the straight line V1, the basis control line L has the control characteristics on the straight line V2.

When the gradient of the basis control line L becomes smaller than the gradient of the straight line V1, the blower level is lower than 31 (maximum level) even when the cooling water temperature TW is increased to 73° C. In this case, the blower level is changed in an area within the control area As below the straight line V1, thereby the blower level is changed slowly in accordance with the change of the cooling water temperature TW. For example, when the gradient of the basis control line L is changed to the gradient of the straight line V3 from that of the straight line V1, the basis control line L has the control characteristics on the straight line V3. Because the gradient of the basis control line L after learning is changed to be smaller than the gradient of the straight line V1 connecting the points "a" and "b", the change rate of the blower level (air-blowing amount B(TW)) relative to the cooling water temperature is smaller than that before learning, thereby improving a heat feeling given to the passenger.

The water temperature control map 100A used for the learning and changing of the set air amount also includes triangle areas Ta, Tb located on the right and left sides of the control area As, as shown in FIG. 5. The triangle area Ta on the right side of the control area As is an area enclosed by the points "b" and "c" and the cross point "e" of the cooling water temperature of 73° C. and the blower level of 1. The triangle area Tb on the left side of the control area As is an area enclosed by the points "a" and "d" and the cross point "f" of the cooling water temperature of 38° C. and the blower level of 31. If the air blowing amount is set by the passenger in an area other than the three areas As, Ta and Tb, the learning and changing of the set air amount with the water temperature control map 100A is not performed.

In this embodiment, when the cooling water temperature TW at an operation time where the air blowing amount is set by the air-blowing amount selecting switch 37a is in the temperature range between the first temperature (e.g., 38° C.) and the second temperature (e.g., 73° C.), the water temperature control map 100A is learned and changed.

After the learning and changing of the water temperature control map 100A is performed as described above in step S320 of FIG. 4, the blower level (air amount B(TW)) is calculated based on the water temperature control map 100A after learned and changed, in step S330.

In contrast, when the determination of step S300 in FIG. 4 is NO, the air amount B(EN) is calculated based on the environment control map 100B at step S340. The environment control map 100B is similar to that in U.S. Pat. No. 6,498,958 (corresponding to JP-A-2000-293204), which is herein incorporated by reference.

Then, in step S350, the blower voltage is finally determined based on the smaller one of the learned and changed water temperature control map 100A and the environment control map 100B.

According to the above embodiment of the present invention, when the water temperature control map 100A is selected in a case where the passenger sets the air amount, the water temperature control map 100A is learned and changed based on the set air amount. Therefore, it is possible to change the water temperature control map 100A to the control characteristics suiting a passenger's request.

In the water temperature control map 100A, the change range of the control characteristics is limited within the control area As of the lozenge shape. Therefore, in this embodiment, it can prevent a rapid air blowing amount change thereby preventing an unpleasant feeling due to the rapid air blowing amount change, as compared with a case where the control characteristics are changed directly in accordance with the set air amount of the passenger. More particularly, in a low water temperature area where the cooling water temperature TW is equal to or lower that 48° C. or in a high water temperature area where the cooling water temperature TW is equal to or higher than 63° C., when the control characteristics are set to have a rapid air blowing amount change, the unpleasant feeling given to the passenger may be easily caused. According to this embodiment, because the change range of the control characteristics of the water temperature control map 100A is controlled in the control area As, the passenger's unpleasant feeling can be effectively prevented.

Furthermore, when the air amount is set by a passenger in the temperature range of the cooling water temperature TW between the first temperature (the lowest temperature, e.g., 38° C.) and the second temperature (the highest temperature, e.g., 73° C.), the water temperature control map 100A is learned and changed based on the set air amount. Therefore, thermal feeling given to the passenger can be improved by using the control characteristics after learned and changed.

Because the set air amounts of the past plural times (e.g., four times from the present set operation) are also used in the learning and changing of the control characteristics of the water temperature control map 100A, the control characteristics can be suitably changed even when a passenger sets the air amount unusually.

The maps 60, 70, and 80 are stored in the stand-by RAM 31a, and each of maps 60, 70, 80 includes the water temperature control map 100A and the environment control map 100B. The microcomputer 31 determines who is going to ride in the vehicle, and selects a corresponding map among the maps 60, 70 and 80 stored in the stand-by RAM 31a. Therefore, the air blowing amount control can be suitably performed for respective passengers who are going to ride in the vehicle.

Other Embodiments

Although the present invention has been fully described in connection with the preferred embodiments thereof with reference to the accompanying drawings, it is to be noted that various changes and modifications will become apparent to those skilled in the art.

For example, the control characteristics of the water temperature control map 100A are changed in the control area As of a lozenge shape, enclosed by the four points "a", "b", "c" and "d". Here, the temperatures 35° C., 38° C., 48° C., 63° C. and 73° C. of the cooling water temperature TW and the blower levels 1 and 31 are examples for setting the control area As, but can be suitably changed. Furthermore, the position and the shape of the control area As can be arbitrary changed.

In the above-described embodiment, the gradient of the basis control line L is obtained in accordance with the least square approximation by using the set air amounts of the past four times read from the stand-by RAM 31a and the set air amount at the present time. However, the gradient of the basis control line L can be obtained in accordance with the least square approximation by using the set air amount(s) of the past one time or the past plural times read from the stand-by RAM 31a and the set air amount at the present time. For example, the past plural times may be in a range from four times to six times.

In the embodiment as described above, the stand-by RAM 31a includes three maps 60, 70, 80 corresponding to three pre-registered persons who are going to ride in the vehicle, but is not limited thereto. The stand-by RAM 31a may have maps for two or more persons who are going to ride in the vehicle, and may use the appropriate map corresponding to the riding passenger. It is noted that even when the air conditioner system is provided with only one map, the present invention can be applied effectively to this system.

Although in the above-mentioned embodiment the stand-by RAM is used as storing means, the present invention is not limited thereto. Any other storage element may be used.

Such changes and modifications are to be understood as being within the scope of the present invention as defined by the appended claims.

What is claimed is:

1. An air conditioner for a vehicle, comprising:
an air-blowing unit for blowing air into a vehicle compartment;
means for storing a water temperature control map in which an air amount to be blown into the vehicle compartment is set based on a water temperature of cooling water for the vehicle;
means for setting and changing a set air amount by a passenger;
means for determining the air amount to be blown into the vehicle compartment based on the water temperature control map; and
means for learning and changing the water temperature control map based on the set air amount in a case where the set air amount is changed by the setting means, and the determining means determines the air amount to be blown into the vehicle compartment based on the water temperature control map; wherein
the storing means stores an environment control map in which the air amount is set based on an environment condition of the vehicle,
the determining means selects one of the water temperature control map and the environment control map based on the water temperature of the cooling water, and determines the air amount to be blown into the vehicle compartment based on the selected one of the water temperature control map and the environment control map.

2. The air conditioner according to claim 1, wherein
the learning means learns and changes control characteristics of the water temperature control map within a predetermined control range when the water temperature is in a predetermined temperature range.

3. The air conditioner according to claim 2, wherein
the predetermined control range is a range enclosed by a first point where the air amount is a first air amount and the water temperature is a first temperature, a second point where the air amount is the first air amount and the water temperature is a second temperature higher than the first temperature, a third point where the air amount is a second air amount larger than the first air amount and the water temperature is a third temperature that is higher than the first temperature and lower than the second temperature, and a fourth point where the air amount is the second air amount and the water temperature is a fourth temperature higher than the second temperature.

4. The air conditioner according to claim 3, wherein the predetermined control range has a lozenge shape having the first to fourth points.

5. The air conditioner according to claim 1, wherein
the learning means learns and changes control characteristics of the water temperature control map such that a change rate of the air amount relative to a change rate of the water temperature is limited in a predetermined range when the water temperature is in a predetermined temperature range.

6. The air conditioner according to claim 1, further comprising:
a water temperature detecting unit which detects the water temperature, wherein
the learning means learns and changes the water temperature control map only when the air amount is changed by the setting means and the water temperature detected by the water temperature detecting unit is in a predetermined temperature range.

7. The air conditioner according to claim 1, wherein:
the storing means stores set air amounts set and changed at past times; and
the learning means learns and changes control characteristics of the water temperature control map based on the set air amount stored in the storing means and the set air amount set and changed at the present time.

8. The air conditioner according to claim 1, further comprising
means for identifying a passenger riding in the vehicle compartment from pre-registered persons who are going to ride in the vehicle compartment, wherein
the storing means includes plural water temperature control maps corresponding to the respective persons who are going to ride in the vehicle compartment, and
the learning means learns and changes the water temperature control map corresponding to the passenger identified by the identifying means.

9. The air conditioner according to claim 1, wherein
the water temperature control map has control characteristics in which the water temperature and the air amount have a proportionality relation, and
the learning means learns and changes the water temperature control map such that a change rate of the air amount relative to a change rate of the water temperature is changed in the control characteristics based on the proportionality relation by using a point where the air amount is a predetermined air amount and the water temperature is a predetermined water temperature as a center of the proportionality relation.

* * * * *